Dec. 28, 1943.  A. W. BARBER  2,337,534
DEVICE FOR INDICATING EXPOSURE TIME OF PRINTED PAGES
Filed June 14, 1941
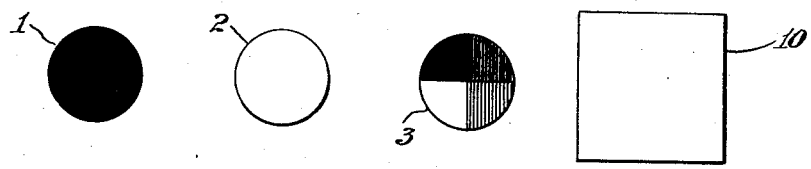
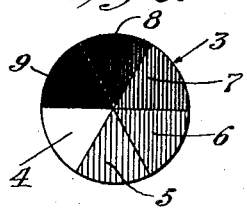 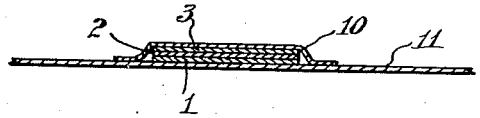
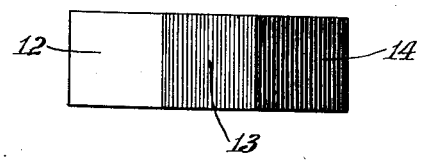 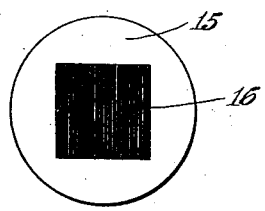
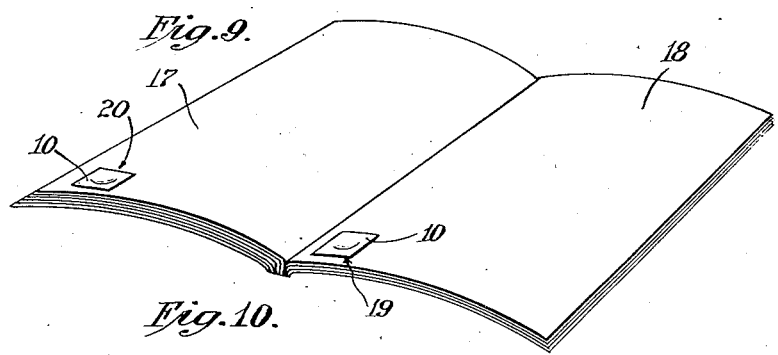
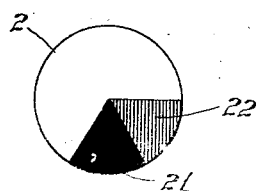
INVENTOR
Alfred W. Barber Patented Dec. 28, 1943

2,337,534

UNITED STATES PATENT OFFICE 2,337,534

DEVICE FOR INDICATING EXPOSURE TIME OF PRINTED PAGES

Alfred W. Barber, Flushing, N. Y.

Application June 14, 1941, Serial No. 398,059

6 Claims. (Cl. 35—1)

The present invention relates to reading time tests and in particular to a photographic device for measuring the time a printed page is exposed to light.

One object of the present invention is to provide means for determining the time a reader spends on each page of a magazine by indicating and recording the time or relative time the page is exposed to light.

Another object is to increase the accuracy of such a device by breaking up the total time into predetermined periods.

Still another object is to equalize the results obtained by daylight with those obtained by artificial light.

These and other objects will be apparent from the detailed description of the invention given in connection with the various figures of the drawing.

In the past it has been necessary to watch a subject and to time him with a stop-watch in order to find out how much time he spends in reading various pages of books, magazines, etc. It will at once be appreciated that if something could be placed on a page of a book or magazine which would automatically record the time spent in reading the page that a great deal of time and expense would be saved in making "reading time" surveys. The present invention concerns a device for recording reading time over wide limits of time, to a high degree of accuracy and inexpensively. Briefly the device consists in a variable density wedge covering a photo-sensitive surface. The photo-sensitive surface is preferably sensitized in the yellow or green portions of the spectrum; it has a steep characteristic curve; and it is provided with an opaque backing. The wedge is dyed to make it selectively transmit yellow or green light corresponding to the color sensitivity of the photo-sensitive surface in order to equalize the readings obtained by daylight with those obtained by artificial light. The combination of wedge and photo-sensitive surface is fastened together and is attached with the wedge uppermost on the page on which the reading time is desired. One wedge and photo-sensitive surface combination may be used on each page or one may be used on each spread. The paper support of the photo-sensitive surface may be marked with the page number or other identifying mark.

In the drawing:

Fig. 1 shows one form of opaque backing.

Fig. 2 shows one form of photo-sensitive surface.

Fig. 3 shows one form of variable density wedge.

Fig. 4 shows one form of mounting.

Fig. 5 shows a second form of wedge.

Fig. 6 shows the wedge combination attached to a magazine page.

Fig. 7 shows an alternate form of wedge.

Fig. 8 shows still another alternate form of wedge.

Fig. 9 shows a detail of alternate wedge positions on magazine pages.

Fig. 10 shows the record obtained according to one form of the invention.

In Fig. 1 is shown a circular piece of opaque material for backing the photo-sensitive surface to prevent light from the other side of the page from affecting the reading. This backing may conveniently be a piece of thin black paper. The effect of the backing may also be obtained by coating the back of the photo-sensitive surface support or the page to which the combination is attached with opaque material such as black printer's ink.

In Fig. 2 is shown photo-sensitive surface which may be on any convenient support such as thin paper. The photo-sensitive surface is preferably dye-sensitized or otherwise rendered highly sensitive to green or yellow light so that it will respond readily to artificial light and minimize the effect of daylight especially the blue or ultra-violet. Tabulation of the records obtained may be simplified if a photo-sensitive surface having a steep characteristic curve is used since the exposure steps will be thereby made more definite.

In Fig. 3 is shown one form of variable density wedge. The wedge may be made most conveniently by exposing sectors of a disc of photographic film by varying amounts. When the film is developed and fixed, sectors of varying density are produced. The density of the various sectors, their number, and total density range is determined by the time intervals to be recorded. For instance, if the time interval ratio between each step is two to one, the density of the sectors should differ by 0.3. Again, if the lowest time interval is 2 seconds, 4 seconds, 8 seconds, 16 seconds, 32 seconds and 64 seconds may be recorded on a six sector wedge. In practice it has been found possible to cover a total time range of 1000 to 1 with a single wedge and photo-sensitive surface and with 12 or more intervals. The variable density wedge may be dyed or made on a dyed support which transmits yellow or green light corresponding to the sensitivity maximum of the photo-sensitive surface. The wedge color transmission and the photo-sensitive surface response combine to equalize the record produced by daylight with that produced by artificial light. Without this provision the usual photo-sensitive surface is highly sensitive to blue and ultra-violet light and daylight would give an abnormally high reading in the record.

Fig. 4 shows one device for attaching the wedge and photo-sensitive surface combination to the magazine page. It may be a piece of transparent adhesive, or may be dyed like the wedge.

Fig. 5 shows a variable density wedge which is a modified form of the form shown in Fig. 3 enlarged to show more detail. This wedge has six sections, namely, 4, 5, 6, 7, 8 and 9. Section 4 has very low density, say about 0.1 while the density of each of the other steps is increased in definite proportion. Thus, section 5 may have a density of 0.4, section 6 of 0.7, section 7 of 1.0 etc.

Fig. 6 shows how the photo-sensitive surface 2, placed over the backing piece 1 and under the wedge 3, may be attached to a magazine page 11 by the adhesive 10. The adhesive 10 may be colored to selectively transmit yellow or green light, in addition to, or in place of, the dyeing of the wedge. The combination may also be attached to the page by omitting adhesive 10 and attaching the various pieces together and to the page with a suitable liquid adhesive. Mucilage has been found to be a suitable adhesive and the device may be taken apart after use for development and tabulation by soaking in water. A number corresponding to the page number or other identifying mark may be placed on the back of the photo-sensitive surface support.

Fig. 7 shows an alternate form of wedge in which the sections of variable density are rectangular.

Fig. 8 shows another alternate form of the invention in which a photo-sensitive surface 15 is partially covered with a single density wedge 16. This provides two ranges of light reaching the sensitive surface and may be useful where only two ranges or a narrow range of time is to be recorded. The record scale may be extended by the use of a photo-sensitive surface having an extended exposure range.

Fig. 9 shows a magazine having adjacent pages 17 and 18. One wedge and photo-sensitive surface combination 19 is shown mounted on the inside edge or trough of the page. This position is useful where artificial lighting is received on the page at an acute angle and daylight at an obtuse angle since more shadow is cast and less exposure is produced at the obtuse angle tending to reduce the daylight values to those obtained with artificial light. At 20 is shown another wedge and photo-sensitive surface combination near the outer edge of the page. This position yields more uniform record results from uniform light conditions since fewer shadows are cast.

Fig. 10 shows a typical record produced by the reading time device of the present invention. The photo-sensitive surface 2 has been exposed on the page of a magazine and has been developed and fixed. The record shows a totally exposed section 21 which is full black, and a partially exposed section 22 partially exposed. This shows that the page on which this photo-sensitive surface was used was read more than the time indicated by the first wedge step and less than the time of the third wedge step. It also indicates that the time was within the second step interval which, for instance, might be 2 to 4 seconds. Comparison with a calibrated meter for the photo-sensitive surface might show that the actual exposure was 3.5 seconds.

While a proper choice of steps, the equalization of daylight exposures to those of artificial light, and a proper choice of a photo-sensitive surface provide fair results, it is important that the development and fixing of the exposed surfaces be standardized accurate results. Calibrations may be made by exposing test photo-sensitive surfaces thru standard wedges for varying amounts of time and under standard light conditions. The readings for the actual results are obtained by comparing them with the calibration samples.

The reading times obtained with the present inveniton are individually modified by the intensity of the reading light. However, it has been found that a large percentage of reading is done under light quite close to the average. While a single sample of reading time taken according to the present invention may be in error, the error is eliminated by taking the average of a number of samples. In general, sufficient accuracy for most purposes may be obtained with as few as 100 samples.

While one embodiment and a few modifications of the present invention have been shown and described, many modifications will be apparent to those skilled in the art within the spirit and scope of the invention as set forth in the appended claims.

What is claimed is:

1. In an apparatus for indicating the length of time a page between a plurality of pages of an article has been open to light, a piece of photosensitive material disposed on the face of said page, a variable density wedge superimposed over said piece of photosensitive material, and holding means securing said variable density wedge to said page in said superimposed position.

2. In an apparatus for indicating the length of time a page between a plurality of pages of an article has been open to light, a piece of photosensitive material disposed on the face of said page, a variable density wedge superimposed over said piece of photosensitive material, holding means securing said variable density wedge to said page in said superimposed position, and opaque backing material disposed between said piece of photosensitive material and the face of said page.

3. In an apparatus for indicating the length of time a page between a plurality of pages of a article has been open to light, a piece of photosensitive material disposed on the face of said page, a variable density wedge superimposed over said piece of photosensitive material, and holding means securing said variable density wedge to said page in said superimposed position, the means comprising a cap disposed over and enclosing said piece of transparent material and said variable density wedge, the edges of the cap being secured to the face of the page, at least the portion of the cap overlying said wedge being substantially transparent.

4. In an apparatus for indicating the length of time a page between a plurality of pages of an article has been open to light, a piece of photosensitive material disposed on the face of said page, a variable density wedge superimposed over said piece of photosensiitve material, and holding means securing said variable density wedge to said page in said superimposed position, the photosensitive material being sensitized primarily to a predetermined color, the variable density wedge being formed to pass said color only.

5. In an apparatus for indicating the length of time a page between a plurality of pages of an article has been open to light, a piece of photosensitive material disposed on the face of said page, a variable density wedge superimposed over said piece of photosensitive material, holding means securing said variable density wedge to said page in said superimposed position, and filter means for reducing the transmission of a predetermined type of light also superposed over said piece of photosensitive material, the piece of photosensitive material, wedge, and filter means all being secured to said page by said holding means.

6. In an apparatus for indicating the length of time two or more pages of an article comprising a plurality of printed pages have been open to light, a pair of devices respectively disposed on the adjacent faces of two adjacent pages, each device comprising a sheet of opaque backing material disposed over its respective page, a sheet of photosensitive material disposed over the sheet of backing material, a sheet of material forming a variable density wedge disposed over the sheet of photosensitive material, and means securing said sheets to their respective pages superposed in the order named.

ALFRED W. BARBER.